US009133779B2

(12) United States Patent
Hughes

(10) Patent No.: US 9,133,779 B2
(45) Date of Patent: Sep. 15, 2015

(54) APPARATUS AND METHODS FOR PROVIDING BLENDED NATURAL GAS TO AT LEAST ONE ENGINE

(71) Applicant: Baker Hughes Incorporated, Houston, TX (US)

(72) Inventor: Ronnie D Hughes, Montgomery, TX (US)

(73) Assignee: BAKER HUGHES INCORPORATED, Houston, TX (US)

( * ) Notice: Subject to any disclaimer, the term of this patent is extended or adjusted under 35 U.S.C. 154(b) by 37 days.

(21) Appl. No.: 13/868,526

(22) Filed: Apr. 23, 2013

(65) Prior Publication Data

US 2014/0311469 A1    Oct. 23, 2014

(51) Int. Cl.
| | |
|---|---|
| F02M 21/02 | (2006.01) |
| F02B 7/00 | (2006.01) |
| F02B 43/00 | (2006.01) |
| F02D 19/06 | (2006.01) |

(52) U.S. Cl.
CPC ....... *F02D 19/0647* (2013.01); *F02M 21/0215* (2013.01); *F02M 21/0218* (2013.01); *Y02T 10/36* (2013.01)

(58) Field of Classification Search
CPC . F02D 41/3094; F02D 41/0025; F02D 19/06; F02M 69/046; F02M 21/02; F02M 21/04; F02M 13/08; F02B 3/06; F02B 43/00
USPC .................................. 123/431, 575, 527, 525
See application file for complete search history.

(56) References Cited

U.S. PATENT DOCUMENTS

| | | | |
|---|---|---|---|
| 4,566,278 A | 1/1986 | Force | |
| 5,074,357 A | 12/1991 | Haines | |
| 5,911,210 A * | 6/1999 | Flach | ............................ 123/527 |
| 6,205,957 B1 | 3/2001 | Saylor | |
| 6,948,562 B2 | 9/2005 | Wellington et al. | |
| 7,429,287 B2 | 9/2008 | Frantz | |
| 7,823,562 B2 * | 11/2010 | Duineveld et al. | ............ 123/431 |
| 8,070,840 B2 | 12/2011 | Diaz et al. | |
| 2002/0007953 A1 | 1/2002 | Liknes | |
| 2008/0207948 A1 | 8/2008 | Davey et al. | |
| 2009/0113749 A1 | 5/2009 | Schellstede | |
| 2010/0000153 A1 | 1/2010 | Kurkjian et al. | |

OTHER PUBLICATIONS

"Analysis of Natural Gas and Natural Gas Liquids by Gas Chromatography", Don E. Clay, Rollen Anderson, Thermo Electron Corporation, Austin, Texas, 2004, 4 pages.
"Blending Fuel Gas to Optimzie use of Off-Spec Natural Gas", Mike Segers et al., ISA Power Industry Division 54th Annual I&C Symposium, 2011, 13 pages.
"Encana Natural Gas Use for Drilling in Western Canada", Adrian Steiner, Calgary, AB, Oct. 28, 2010, 12 pages.
"Lessons Learned: A Case Study in Successful Application of Natural Gas Fuel in High Horsepower Pressure Pumping Services", Pat Osachuk, HHP Summit 2012, Houston, Sep. 27, 2012, 35 pages.

* cited by examiner

*Primary Examiner* — Lindsay Low
*Assistant Examiner* — Syed O Hasan
(74) *Attorney, Agent, or Firm* — E. Randall Smith; Jones & Smith, LLP

(57) ABSTRACT

Apparatus and methods for providing natural gas possessing at least one desired quality to at least one engine include providing raw natural gas and methane gas through first and second conduits, respectively. Based upon measurements of the desired quality or qualities of the raw natural gas, the electronic controller selectively varies the flow of methane gas to provide a blend of raw natural gas and methane gas that possesses desired quality or qualities to the engine(s).

15 Claims, 2 Drawing Sheets

APPARATUS AND METHODS FOR PROVIDING BLENDED NATURAL GAS TO AT LEAST ONE ENGINE

FIELD OF THE DISCLOSURE

The present disclosure relates generally to supplying fuel to engines and, more particularly, apparatus, system and methods for providing blended natural gas to fuel one or more engines.

BACKGROUND

The world of technology is embracing natural gas as an alternative to gasoline and diesel fuel. In particular, the use of natural gas (or other methane-based fuels) to power engines provides a cleaner burning fuel with reduced emissions at a lower cost. For example, bi-fuel engines have been developed that can be powered by a combination of different types of fuels, such as diesel fuel and natural gas. As used herein and in the appended claims, the terms "natural gas" and variations thereof includes natural gas and any other methane-based fuels.

Pure methane gas, such as liquid natural gas (LNG) or compressed natural gas (CNG), is often used in powering these engines because it typically meets the gas quality requirements of the engines. However, LNG and CNG are expensive and require substantial resources because they have to be transported to and from and processed at gas processing plants. It would thus be beneficial to be able to provide raw or unprocessed natural gas from a hydrocarbon well to power the bi-fuel or other natural gas driven engines. This option could provide substantial savings in resources, time and expense. For example, the use of raw natural gas could be particularly ideal in powering engines used, for example, in connection with well drilling, servicing and production operations. However, raw natural gas is unpredictable and can have varying compositions. For example, raw natural gas may include undesirable contaminants and liquids, and possess a variable BTU content. Consequently, raw natural gas may detrimentally affect the performance of the engines or not meet the gas quality requirements of a particular engine. It would therefore be advantageous to be able to blend raw natural gas and methane gas to provide acceptable and suitable fuel for gas-powered engines.

It should be understood that the above-described discussion is provided for illustrative purposes only and not intended to limit the scope or subject matter of this disclosure or any related patent application or patent. Thus, none of the appended claims or claims of any related patent application or patent should be limited by the above examples, features, benefits and limitations or be required to address, include or exclude them merely because of their mention above.

Accordingly, there exists a need for improved systems, apparatus and methods useful in connection with providing natural gas to multiple engines having one or more of the features, attributes or capabilities described or shown in, or as may be apparent from, the other portions of this patent.

BRIEF SUMMARY OF THE DISCLOSURE

In various embodiments, the present disclosure involves systems for providing sufficient methane gas to at least one raw natural gas-powered engine based upon the BTU value of the incoming raw natural gas so that the combination of raw natural gas and methane gas possesses a desired BTU value. The system of these embodiments includes a first gas supply conduit coupled to at least one engine and configured to provide a stream of raw natural gas originating from at least one hydrocarbon well. At least one BTU measurement device is in fluid communication with the raw natural gas before it reaches the at least one engine. The BTU measurement device is configured to measure the BTU value of the raw natural gas before it reaches the engine.

A second gas supply conduit is fluidly coupled to at least one engine and configured to provide a stream of methane gas from a methane gas source into the engine(s). A first flow control valve is associated with the second gas supply conduit and selectively movable between at least one open position and a closed position. In the open position(s), the valve allows the flow of methane gas from the second gas supply conduit to the engine(s). In the closed position, the valve disallows the flow of methane gas from the second gas supply conduit to the engine(s). An electronic controller communicates with the BTU measurement device and first flow control valve. The controller selectively actuates the first flow control valve between open and closed positions based upon the BTU value readings of the raw natural gas taken by the BTU measurement device in order to provide sufficient methane gas to the bi-fuel engine(s) so that the combination of methane gas and raw natural gas provided to the engine(s) possesses the desired BTU value.

The present disclosure includes embodiments of a method of providing natural gas having a desired BTU value to at least one engine that runs at least partially on natural gas and is disposed upon at least one mobile hydraulic fracturing pump unit. The method of these embodiments includes providing a stream of raw natural gas originating from at least one hydrocarbon well and calculating the BTU value of the raw natural gas before it reaches the engine(s). If the BTU value of the raw natural gas is lower than the desired BTU value, sufficient methane gas is blended into the raw natural gas stream to create a blended gas mixture having the desired BTU value. The blended gas mixture is distributed to the engine(s).

Accordingly, the present disclosure includes features and advantages which are believed to enable it to advance engine fuel supply technology. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF PREFERRED EMBODIMENTS

Figure 1:
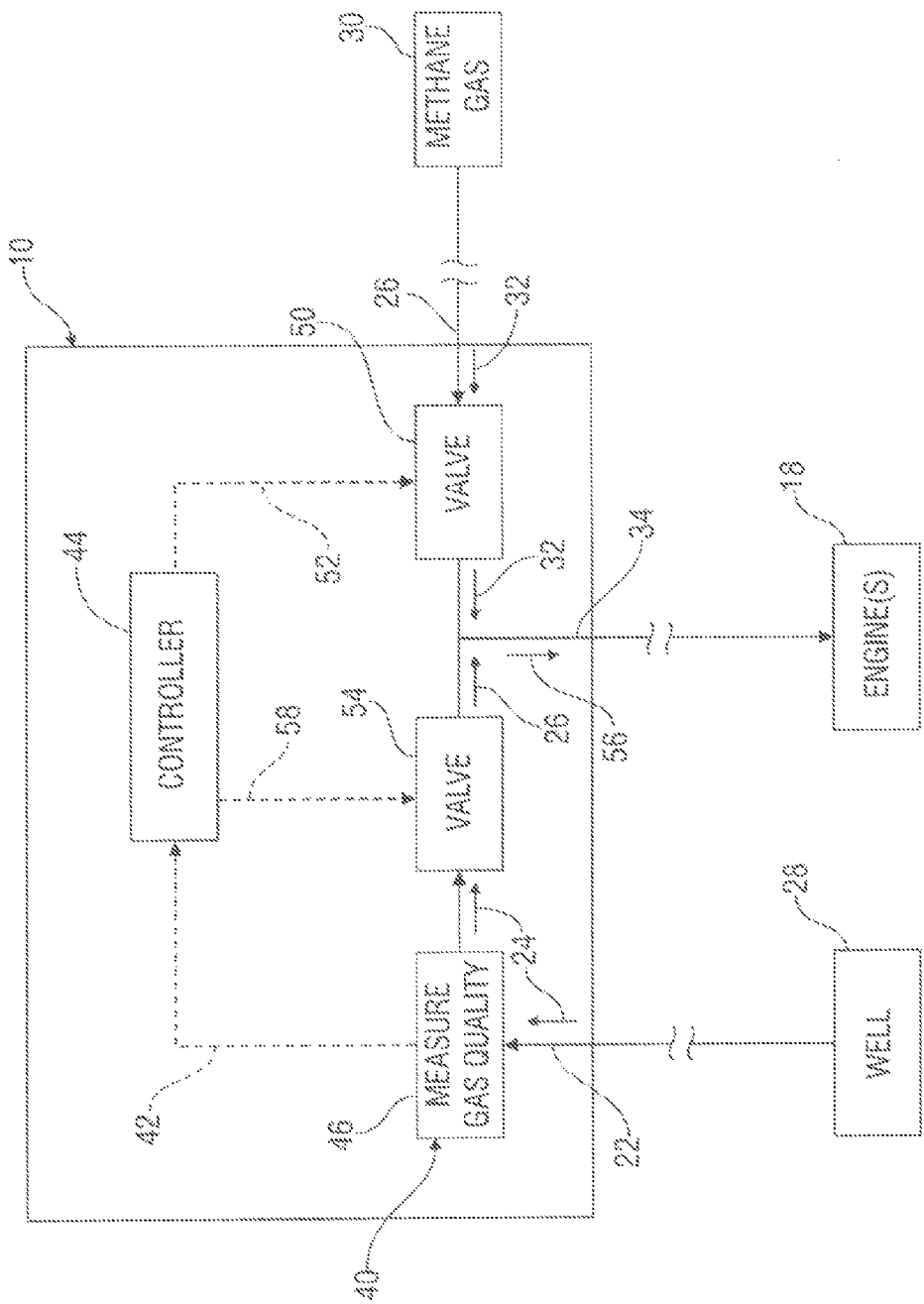
FIG. 1 is a simplified process flow diagram of an embodiment of a gas blending system and method in accordance with the present disclosure.

Characteristics and advantages of the present disclosure and additional features and benefits will be readily apparent to those skilled in the art upon consideration of the following detailed description of exemplary embodiments of the present disclosure and referring to the accompanying figures.

It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

As used herein and throughout various portions (and headings) of this patent application, the terms "invention", "present invention" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference. The terms "coupled", "connected", "engaged" and the like, and variations thereof, as used herein and in the appended claims are intended to mean either an indirect or direct connection or engagement. Thus, if a first device couples to a second device, that connection may be through a direct connection, or through an indirect connection via other devices and connections.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

Referring initially to FIG. 1, in accordance with the present disclosure, an embodiment of a natural gas blending system 10 for providing natural gas having at least one desired quality to at least one engine 18 is shown. In some applications, the natural gas blending system 10 may be a portable or mobile unit, such as a skid, or vehicle, mounted unit. The system 10 may be used with any suitable type of bi-fuel engine that can be powered by natural gas. Further, the engine(s) 18 may be used for any desired purpose. In some applications, the engine 18 may be one or more bi-fuel engine useful for pumping fluids into or out of one or more hydrocarbon wells during drilling, hydraulic fracturing or other operations. For example, the bi-fuel engines may be generators used on drilling rigs during drilling operations or motors used on mobile hydraulic fracturing pump units, such as the currently available bi-fuel Rhino pump unit mounted on an 18-wheel trailer or skid offered by Baker Hughes Incorporated. Thus, the type, configuration and operation of the engine are not limiting upon the present disclosure or appended claims.

The one or more "desired quality" of the natural gas provided to the engine 18 may be any one or more measurable quality of natural gas. A few examples of the desired quality or qualities that may be the subject of some embodiments of the present disclosure are the British Thermal Unit (BTU) value, methane number or methane content of the gas. For example, a presently available bi-fuel Cummins Model Number QSK50 engine has "desired quality" recommendations for natural gas of a BTU value of 1,000 BTU/cubic foot, methane number greater than 80 and methane content higher than 90%. However, the present disclosure and appended claims are not limited by the desired quality or qualities of the natural gas provided to the engine 18 by the system 10, except and only to the extent as may be expressly required in a particular claim. Thus, the examples of desired qualities and specific values thereof mentioned in this patent are not limiting upon the present disclosure. The term "desirable natural gas" will, at times, be used herein to refer to natural gas possessing the desired quality or qualities.

Still referring to the embodiment of FIG. 1, the exemplary blending system 10 includes first and second gas supply pipes, or conduits, 22, 26 in fluid communication with the engine(s) 18. The first gas supply conduit 22 provides an inflow, or stream, of raw natural gas originating from at least one hydrocarbon well 28, while the second gas supply conduit 26 provides an inflow of methane gas from a methane gas source 30. The inflow of raw natural gas is represented in FIG. 1 with arrows 24, and the inflow of methane gas is represented with arrows 32.

As used herein and in the appended claims, the term "raw natural gas" means natural gas originating from one or more hydrocarbon well and which has not been processed at a gas processing plant, though it may have passed through other separator or processing equipment before reaching the system 10, such as on-site separation equipment at the well. The raw natural gas, often referred to as "field gas" or "line gas", may be fed into the first gas supply conduit 22 from one or more wellhead, well site separator equipment, sales line, field line, production line, natural gas pipeline, or the like. However, the present disclosure and appended claims are not limited by the specific source of raw natural gas tied into the first gas supply conduit(s) 22.

The methane gas may have any suitable form and composition, and may be provided from any suitable source 30. In some embodiments, for example, the methane gas may be pure, inert methane gas, such as compressed natural gas (CNG) or liquid natural gas (LNG), and the source 30 may be one or more gas lines from a gas processing plant or gas tanks mounted on a gas tanker truck. The present disclosure and appended claims are not limited by the type of methane gas or the form, type, configuration and location of the methane gas source 30.

In some embodiments, the system 10 may include more than one first and/or second gas supply conduit 22, 26, and the conduits 22, 26 may each effectively include multiple connected pipes. Further, the system 10 may include one or more intermediate conduits 34 fluidly coupled between the engine 18 and either, or both, the first and second gas supply conduits 22, 26. The conduits 22, 26 and 34 may have any suitable form, configuration and operation as are and become further known in the art.

It should be understood that the actual number, type, operation, interconnection and nomenclature used to describe the conduits in the system 10 may vary and is not limiting upon the present disclosure or appended claims. For ease of explanation and illustration, the system 10 includes an intermediate conduit 34, referred to herein as the "gas distribution" conduit, into which both the first and second gas supply conduits 22, 26 flow. However, the reader should be aware that the gas distribution conduit 34 may, in fact, be part of or one-in-the-same with the first or second gas supply conduit 22, 26. Thus, the term "gas distribution conduit" as used herein and in the appended claims means the first gas supply conduit, the second gas supply conduit or an intermediate conduit disposed between the engine(s) 18 and the first and second gas supply conduits 22, 26.

Still referring to the embodiment of FIG. 1, the natural gas blending system 10 also includes at least one desired gas quality (DGQ) measurement device 40 in fluid communication with the first gas supply conduit 22, first flow control valve 50 in fluid communication with the second gas supply conduit 26 and electronic controller 44 in communication with both the DGQ measurement device 40 and valve 50. These components may have any suitable form, configuration and operation, and may be commercially available or off-the-shelf devices, as are and become further known. Thus, the present disclosure and appended claims are not limited by the type, configuration and operation of these components, except and only to the extent as may be expressly required in a particular claim.

For example, the first flow control valve 50 may be a Dungs or Apollo ball valve. The illustrated first flow control valve 50 is selectively movable between at least one open position and a closed position. The one or more open positions allow the flow of methane gas from the second gas supply conduit 26 to the illustrated gas distribution conduit 34 (and ultimately to the engine 18), while the closed position disallows such flow.

The illustrated DGQ measurement device 40 measures the desired quality of the raw natural gas in the first gas supply conduit 22 (before reaching the engine 18) and communicates its readings or results to the controller 44 (arrow 42). The particular type of DGQ measurement device 40 may vary depending upon one or more variable, such as the type of engine 18, the source or type of raw natural gas, etc. For example, if the desired quality of the raw natural gas is its BTU value, the DGQ measurement device 40 may be a BTU measurement device 46. In some applications, the DGQ measurement device 40 may be a gas chromatograph or mass spectrometer useful to measure the BTU value of the raw natural gas and/or one or more other desired quality, as is and becomes further known in the art. If desired, the system 10 may include multiple DGQ measurement devices 40.

Still referring to the example of FIG. 1, the controller 44 is programmed to determine, based at least in part upon information provided to it by the DGQ measurement device 40, the quantity of methane gas (if any) needed to blend into the raw natural gas to create the desirable natural gas. For example, if the desired quality is the BTU value of the gas, the DGQ measurement device 40 provides the BTU value of the raw natural gas to the controller 44. The controller then determines (i) if the BTU value of the raw natural gas is sufficient or should be supplemented with methane gas and (ii) how much methane gas is needed. Accordingly, the controller 44 communicates with the first flow control valve 50 (arrow 52) to move it between positions in order to provide the necessary quantity of methane gas from the second gas supply conduit 26 into the gas distribution conduit 34. Ideally, a minimal quantity of methane gas is used to formulate the desirable natural gas. The desirable natural gas, which may thus be a blend of raw natural gas and methane gas as determined by the controller 44, flows from the gas distribution conduit 34 to the engine(s) 18 (arrow 56).

Still referring to the embodiment of FIG. 1, if desired, the system 10 may include a second flow control valve 54 associated with the first gas supply conduit 22 and also in communication with the electronic controller 44. The second flow control valve 54 may have any suitable form, configuration and operation. In this embodiment, the second flow control valve 54 operates similarly to the first flow control valve 50, having at least one open position and a closed position, and allowing the controller 44 to actuate it (arrow 58) and control the flow raw natural gas fed to the engine(s) 18 from the first gas supply conduit 22. For example, in some applications there may be times when it is desirable to shut off the flow of raw natural gas and provide only methane gas from the second gas supply conduit 26 to the engine 18.

In some embodiments, the first and/or second flow control valve 50, 54 may have multiple open positions that allow the flow of gas at different flow rates from the respective gas supply conduit 26, 22. In such instance, the exemplary controller 44 may more selectively vary the flow rate of each or either type of gas to the engine 18 by varying the open position of the respective flow control valves 50, 54. In some applications, this may allow the distribution of a more accurate and controlled flow of desirable natural gas to the engine 18.

The illustrated controller 44 thus provides an automated system for electronically controlling the blending of raw natural gas and methane gas to distribute a generally constant, consistent supply of desirable natural gas to the engine(s) 18. In some embodiments, the controller 44 may be programmed to perform the above acts and, as necessary, adjust the amount of each or either type of gas provided to the engine 18 at pre-programmed intervals or times, on a real-time basis, as dictated by an operator, on another basis or a combination thereof. In many embodiments, the controller 44 will automatically adjust the proportion of each type of gas sufficient to effectively "average out" the desired quality in the desirable natural gas flowing to the engine(s) 18.

Figure 2:
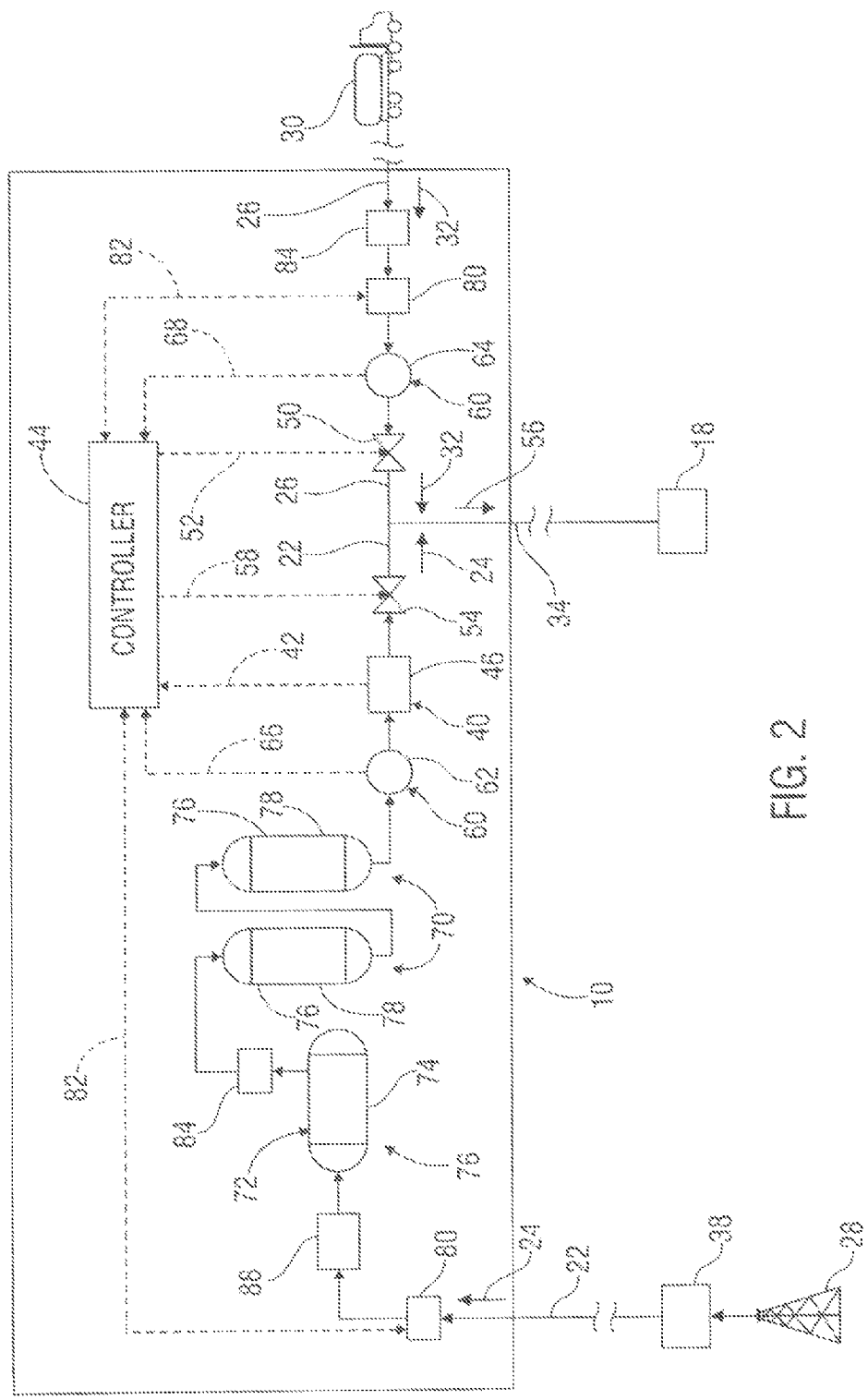
FIG. 2 is a simplified process flow diagram of another embodiment of a gas blending system and method in accordance with the present disclosure.

Now referring to the embodiment of FIG. 2, the natural gas blending system 10 may have additional components. For example, the exemplary system 10 may include one or more flow meters 60 associated with one or more of the conduits 22, 26 and 34 and in communication with the controller 44. The flow meters 60 may have any suitable form, configuration and operation, and may be commercially available devices, as are and become further known. For example, the flow meters 60 may be coriolis flow meters. In this embodiment, first and second flow meters 62, 64 are in communication with the controller 44 (arrows 66, 68) and fluidly engaged with the first and second gas supply conduits 22, 26 to measure the flow rate of gas therein, respectively. The illustrated controller 44 may be programmed to use flow rate information from the flow meter(s) 60 to assist in determining whether, when and how much to vary the flow rate of raw natural gas and methane gas to the engine(s) 18.

In some applications, it may be desirable or necessary for the natural gas blending system 10 to remove at least one type of contaminant or component from the raw natural gas. For example, if the raw natural gas is not processed through any processing or separator equipment at the well site or elsewhere before reaching the system 10, it may be necessary to remove one or more contaminant or component from the raw natural gas. In many instances, this may be necessary even if the raw natural gas passes through processing or separator equipment 38 located at or near the well 28 or elsewhere. In this embodiment, the system 10 includes at least one separator 70 fluidly coupled to the first gas supply conduit 22 and configured to remove at least one type of contaminant in or component of the raw natural gas stream flowing therethrough.

The separator(s) 70 may have any suitable form, configuration and operation, and may be commercially available devices, as are and become further known. Further, the type of separator 70 used in the system 10 may depend upon one or more factors and may vary widely. For example, raw natural gas from different geographic regions may have different compositions and separation requirements. In some applications, the separator 70 may include one or more oil/condensate removal device 72 that removes oil and condensates from the raw natural gas stream, as is and becomes further known. For example, the oil/condensate removal device 72 may be a conventional separator 74. In many applications, the separator 70 may include one or more dehydrator 76 that removes water from the raw natural gas stream using absorption or adsorption, as is and becomes further known. For example, the dehydrator 76 may include one or more adsorption, or solid-desiccant dehydration, towers 78. In this embodiment, the system 10 is shown including one conventional separator 74 and two adsorption towers 78.

Still referring to FIG. 2, some embodiments of the system 10 may include one or more pressure regulators 80 associated with one or more of the conduits 22, 26, 34 and in communication with the controller 44 (arrow 82). The pressure regulator(s) 80 may have any suitable form, configuration and operation, and may be commercially available, as are and become further known. When one or more pressure regulators 80 are included, the controller 44 may be programmed to set the pressure regulator(s) 80 to control the pressure of gas in the respective corresponding conduits.

Any other desired components may be included in the system. For example, various embodiments of the system 10 may include one or more scent injectors 84 associated with the first and/or second gas supply conduits 22, 26 and used to inject a detectable scent into the gas flowing therethrough to allow detection of leaks. The scent injectors 84 may have any suitable form, configuration and operation, and may be commercially available devices, as are and become further known. For another example, in some applications, it may be desirable or necessary to include gas sweetening equipment 88 fluidly coupled to the first gas supply conduit 22 and used to "sweeten" any sour gas contained in the raw natural gas stream, as is and becomes further known. The gas sweetening equipment 88 may have any suitable form, configuration and operation, and may be commercially available devices.

The details of operation of each component mentioned above are known in the art and the various components of the system 10 may be connected in any suitable manner, as is and becomes further known in the art. For example, flanges may be used between various components as needed or desired. In many applications, flanges may be advantageous over other types of connections, such as threaded connections, by providing stronger seals and reducing gas leakage at the connection points.

Preferred embodiments of the present disclosure thus offer advantages over the prior art and are well adapted to carry out one or more of the objects of this disclosure. However, the present invention does not require each of the components and acts described above and is in no way limited to the above-described embodiments or methods of operation. Any one or more of the above components, features and processes may be employed in any suitable configuration without inclusion of other such components, features and processes. Moreover, the present invention includes additional features, capabilities, functions, methods, uses and applications that have not been specifically addressed herein but are, or will become, apparent from the description herein, the appended drawings and claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

While exemplary embodiments of the invention have been shown and described, many variations, modifications and/or changes of the system, apparatus and methods of the present invention, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

The invention claimed is:

1. System for providing sufficient methane gas to at least one raw natural gas-powered engine based upon the BTU value of the incoming raw natural gas so that the combination of raw natural gas and methane gas possesses a desired BTU value, the system comprising:
   a first gas supply conduit fluidly coupled to the at least one engine and configured to provide a stream of raw natural gas originating from at least one hydrocarbon well to the at least one engine;
   at least one BTU measurement device in fluid communication with the raw natural gas before it reaches the at least one engine, said BTU measurement device configured to measure the BTU value of the raw natural gas before it reaches the at least one engine;
   a second gas supply conduit fluidly coupled to the at least one engine and configured to provide a stream of methane gas from a methane gas source to the at least one engine, said second gas supply conduit not being in fluid communication with said BTU measurement device;
   a first flow control valve associated with said second gas supply conduit, said first flow control valve being selectively movable between at least one open position and a closed position, said first flow control valve in said at least one open position allowing the flow of methane gas from said second gas supply conduit to the at least engine, said first flow control valve in said closed position disallowing the flow of methane gas from said second gas supply conduit to the at least engine; and
   an electronic controller in communication with said BTU measurement device and said first flow control valve, said electronic controller configured to selectively actuate said first flow control valve between open and closed positions based upon the BTU value readings of the raw natural gas taken by said BTU measurement device to provide sufficient methane gas to the at least one engine so that the combination of methane gas from said second gas supply conduit and raw natural gas from said first gas supply conduit provided to the at least one engine possesses the desired BTU value.

2. The system of claim 1 wherein said first flow control valve has multiple open positions that allow the flow of methane gas at different flow rates from said second gas supply conduit to the at least engine, further wherein said electronic controller is configured to control and vary the flow rate of methane gas the at least engine conduit by varying the position of said first flow control valve.

3. The system of claim 1 further including a second flow control valve associated with said first gas supply conduit, said second flow control valve being selectively movable between at least one open position and a closed position, said second flow control valve in said at least one open position allowing the flow of raw natural gas from said first gas supply conduit to the at least one engine, said second flow control valve in said closed position disallowing the flow of raw natural gas to the at least one engine, said second flow control valve being in communication with said electronic controller, said electronic controller being configured to selectively actuate said second flow control valve between open and closed positions to vary the flow of raw natural gas to the at least one engine.

4. The system of claim 1 further including at least one separator fluidly coupled to said first gas supply conduit, said at least one separator being configured to remove at least one component of the raw natural gas stream therefrom before it reaches the at least one engine.

5. The system of claim 4 wherein a first said separator includes an oil/condensate removal device configured to remove oil and condensates from the raw natural gas stream.

6. The system of claim 4 wherein a second said separator includes a dehydrator configured to remove water from the raw natural gas stream.

7. The system of claim 4 wherein said BTU measurement device is at least one among a gas chromatograph and a mass spectrometer.

8. A method of providing natural gas having a desired BTU value to at least one engine that runs at least partially on natural gas and is disposed upon at least one mobile hydraulic fracturing pump unit, the method comprising:
   providing a stream of raw natural gas originating from at least one hydrocarbon well;
   calculating the BTU value of the supplied raw natural gas before it reaches the at least one engine;
   if the BTU value of the raw natural gas is lower than the desired BTU value, blending sufficient methane gas into the raw natural gas stream to create a blended gas mixture having the desired BTU value; and
   distributing the blended gas mixture to the at least one engine disposed upon at least one mobile hydraulic fracturing pump unit.

9. The system of claim 6 wherein said at least one dehydrator includes at least one desiccant dehydrator.

10. The system of claim 1 further including first and second flow meters fluidly coupled to said first and second gas supply conduits and configured to measure the flow rate of gas therein, respectively, and provide data relating thereto to said electronic controller.

11. The system of claim 10 further including at least one scent injector fluidly coupled to at least one among said first and second gas supply conduits and configured to inject a detectable scent into the gas stream therein.

12. The system of claim 1 further including at least one gas sweetening device fluidly coupled to said first gas supply conduit and configured to sweeten any sour gas contained in the raw natural gas stream therein.

13. The system of claim 12 further including first and second pressure regulators fluidly coupled to said first and second gas supply conduits and configured to vary the pressure of the gas stream therein, respectively.

14. The system of claim 1 further including a portable skid upon which the other components of the system and mounted.

15. The system of claim 14 wherein said methane gas source is a vehicle-mounted tank and the methane gas is at least one among compressed natural gas and liquid natural gas.

* * * * *